United States Patent
Jang et al.

(10) Patent No.: US 6,940,697 B2
(45) Date of Patent: Sep. 6, 2005

(54) INTERCONNECTION SCHEME FOR HEAD ARMS OF DISK DRIVE ACTUATOR

(75) Inventors: Eun Kyu Jang, San Jose, CA (US); Hung Jai Lee, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 20 days.

(21) Appl. No.: 10/007,259

(22) Filed: Dec. 5, 2001

(65) Prior Publication Data

US 2003/0103296 A1 Jun. 5, 2003

(51) Int. Cl.⁷ .............................. G11B 5/48; G11B 5/55
(52) U.S. Cl. ............................. 360/264.2; 360/234.5; 360/245.9
(58) Field of Search ..................... 360/234.5, 265.7, 360/265.9, 266, 266.3, 97.01, 245.8, 245.9, 264.2

(56) References Cited

U.S. PATENT DOCUMENTS

| | | | | | |
|---|---|---|---|---|---|
| 4,819,094 | A | * | 4/1989 | Oberg | 360/245.9 |
| 5,491,597 | A | * | 2/1996 | Bennin et al. | 360/245.9 |
| 5,608,591 | A | * | 3/1997 | Klaassen | 360/245.9 |
| 5,717,547 | A | * | 2/1998 | Young | 360/246 |
| 5,737,152 | A | * | 4/1998 | Balakrishnan | 360/245.9 |
| 5,754,369 | A | * | 5/1998 | Balakrishnan | 360/264.2 |
| 5,805,382 | A | * | 9/1998 | Lee et al. | 360/244.1 |
| 5,812,344 | A | * | 9/1998 | Balakrishnan | 360/245.9 |
| 5,864,446 | A | * | 1/1999 | Endo et al. | 360/244.6 |
| 5,912,787 | A | * | 6/1999 | Khan et al. | 360/245.8 |
| 5,995,328 | A | * | 11/1999 | Balakrishnan | 360/245.9 |
| 6,268,981 | B1 | * | 7/2001 | Coon et al. | 360/244.3 |
| 6,278,583 | B1 | * | 8/2001 | Adley | 360/244.1 |
| 6,480,359 | B1 | * | 11/2002 | Dunn et al. | 360/245.9 |

* cited by examiner

*Primary Examiner*—Brian E. Miller
(74) *Attorney, Agent, or Firm*—Gregory Smith & Associates; Jeffrey P. Aiello; Earle Jennings

(57) ABSTRACT

The invention includes at least one head arm providing head electrical interconnection as essentially parallel traces on at least one face of the head arm using the metallic body of the head arm as a ground plane. This insures that the neighboring pairs of parallel traces used for differential read and write interconnection have essentially matched impedance, lowering crosstalk between the write and read signal pairs. The invention includes voice coil actuator arms comprising at least one of these head arms, as well as, disk drives made using these voice coil actuator arms.

20 Claims, 4 Drawing Sheets

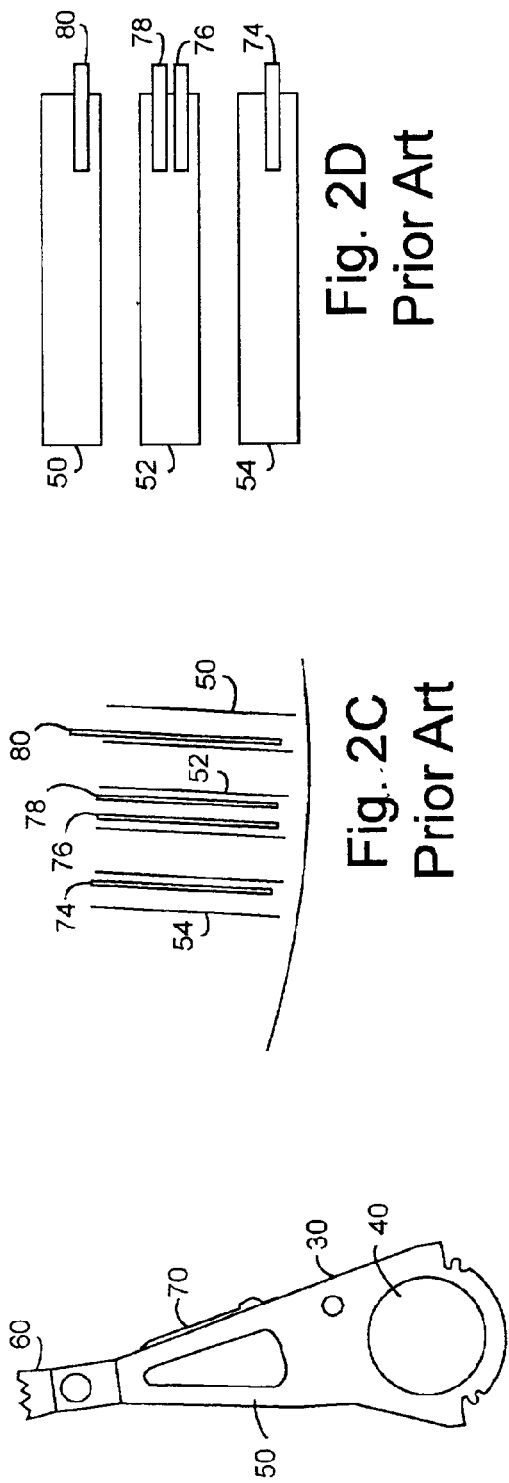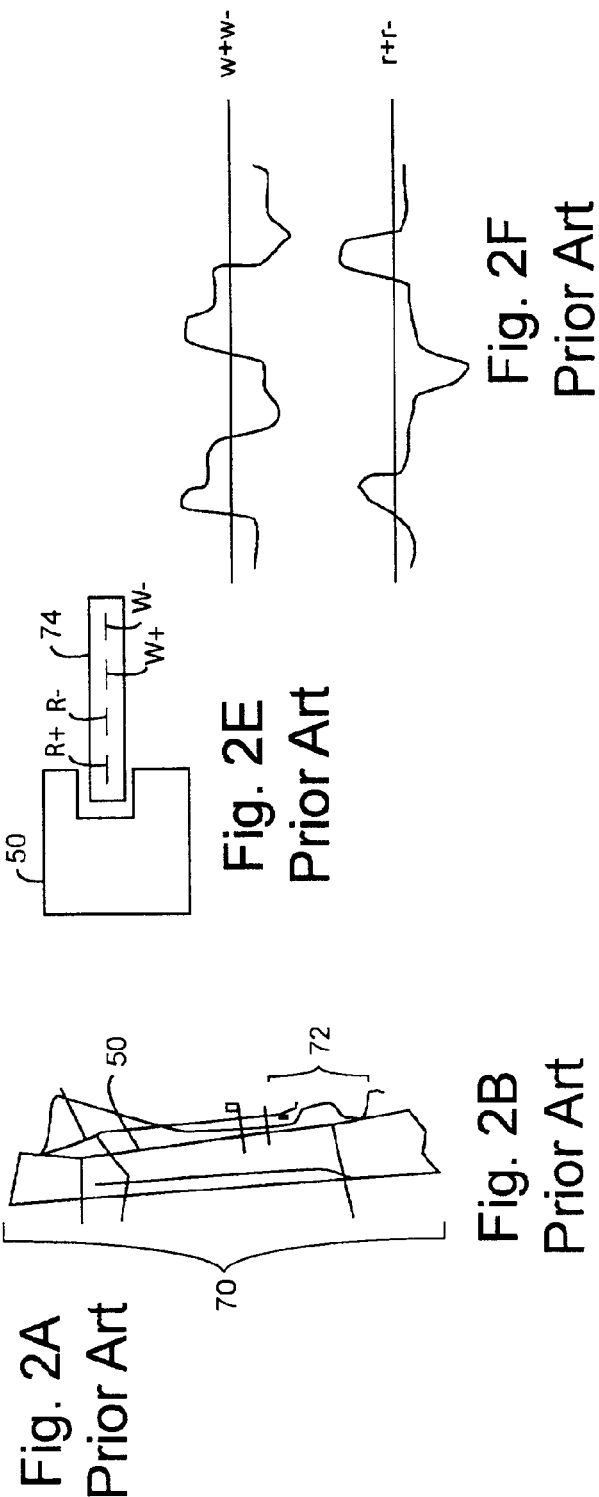

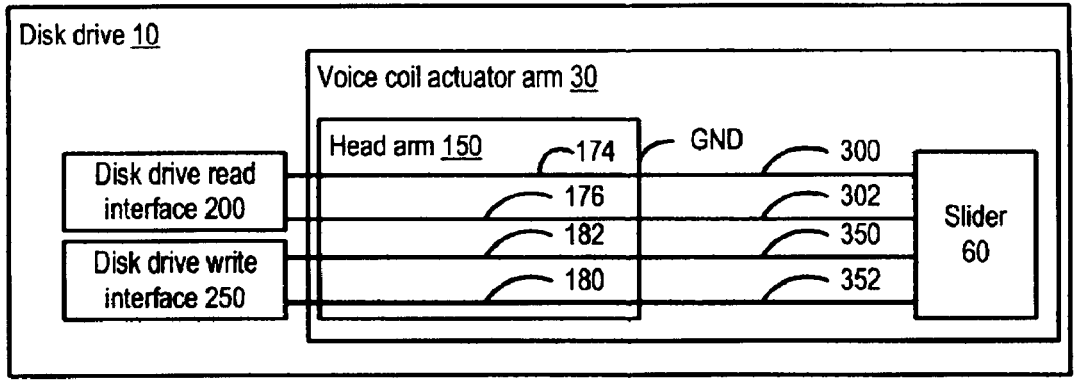
Fig. 4A
Fig. 4B
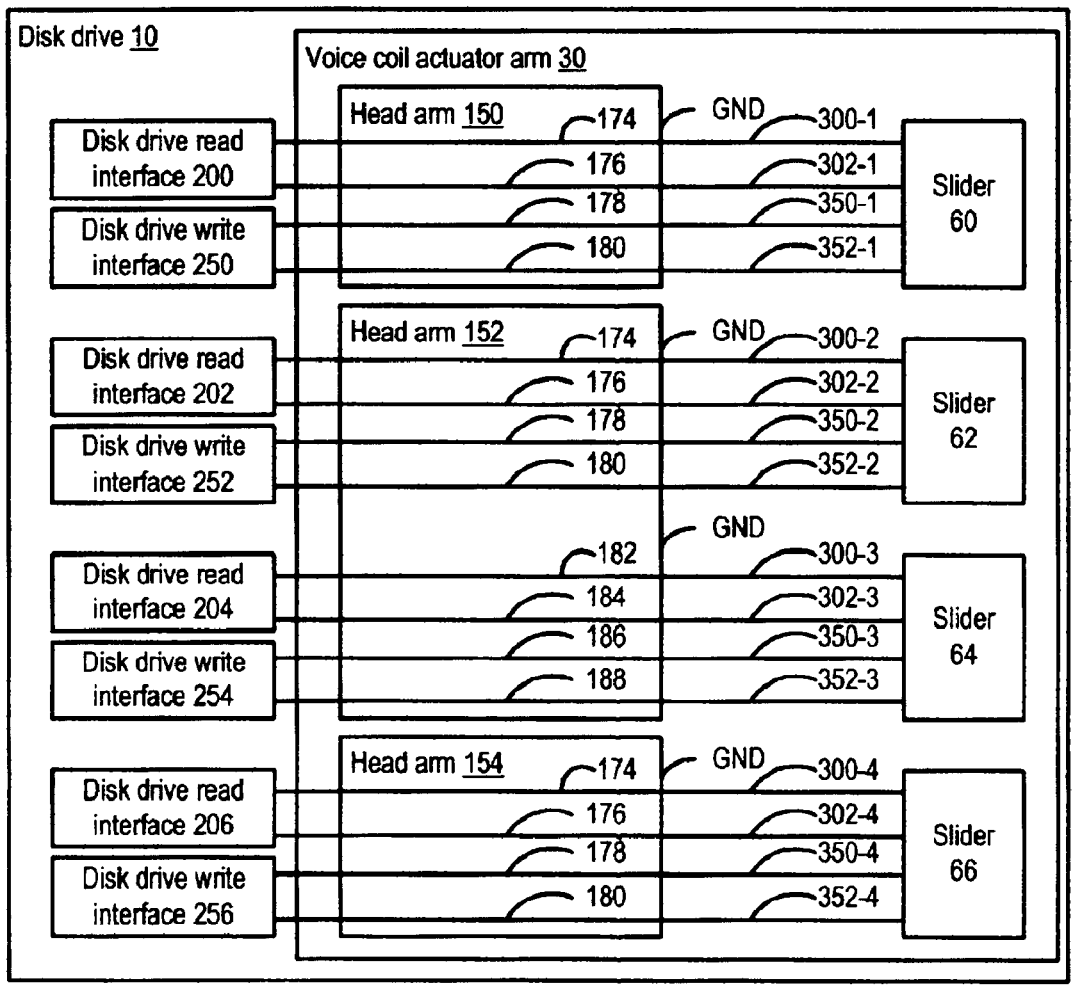

INTERCONNECTION SCHEME FOR HEAD ARMS OF DISK DRIVE ACTUATOR

TECHNICAL FIELD

This invention relates to the electrical interconnection of the heads of a disk drive using the head arms of the disk drive voice coil actuator.

BACKGROUND ART

Disk drives are an important data storage technology, which is based on several crucial components. These components include the interconnection between the read/write heads, which actually communicate with a disk surface containing the data storage medium, and the read/write interfaces of the disk drive. While there has been great progress in disk drives, there are problems which have yet to be solved.

FIG. 1A illustrates a typical prior art high capacity disk drive 10 including actuator arm 30 with voice coil 32, actuator axis 40, suspension or head arms 50–58 with slider/head unit 60 placed among the disks.

FIG. 1B illustrates a typical prior art high capacity disk drive 10 with actuator 20 including actuator arm 30 with voice coil 32, actuator axis 40, head arms 50–56 and slider/head units 60–66 with the disks removed.

Since the 1980's, high capacity disk drives 10 have used voice coil actuators 20–66 to position their read/write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with remarkable speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

The evolution of disk drives stimulated the computer revolution. While contemporary actuator designs are essential to the progress to date, there remain problems limiting the reliability and capability of disk drives built with contemporary voice actuators. One problem has to do with the method of electrically interconnecting heads to the head interface electronics.

FIGS. 2A, 2B, 2C and 2D illustrate a prior art actuator arm from the top view, detailed portion of top view, side view and front views, respectively.

FIG. 2A illustrates a top view of a prior art actuator arm 30 showing head arm 50, actuator axis 40, and head slider 60 of FIG. 1 with detail region 70 illustrated in FIG. 2B.

FIG. 2B illustrates a top view of detail region 70 of FIG. 2A.

FIG. 2C illustrates a side view of part of detail region 70 of FIG. 2B indicating the interconnections 74–80 via various head sliders as found in the prior art. Each of these labeled interconnections includes two pairs of differential signals. One differential signal pair interconnects a read head to a read interface of the disk drive. The other differential signal pair interconnects a write head to a disk drive write interface.

FIG. 2D illustrates a different perspective on FIG. 2C, illustrating that these signal interconnections 74 may be embodied as various forms of cables attached to a head arm, including flex and ribbon cables.

FIG. 2E illustrates an alternative prior art electrical interconnection scheme for 74–80 essentially parallel to head arm 50. FIG. 2E is typical of prior art uses of flex circuitry to interconnect head sliders and disk read/write interfaces. Four individual traces are used for the read differential signal pair (R+, R−) and the write differential signal pair (W+, W−).

FIG. 2F illustrates a typical signal strength situation between a write differential signal pair and a read differential signal pair.

All of the known prior art face similar circuit situations, leading to a common problem. The differential signal traces are situated at differing distances from the ground plane, which runs through the head arms. Additionally, the differential signal traces are often not parallel to each other within the pair. These two situations lead differing differential signal pairs to have impedance mismatches, creating significant crosstalk between them.

Crosstalk is a function of both the distance between traces D, and the distance from the ground plane H. Crosstalk is proportional to $1/(1+(D/H)^2)$.

Most importantly, the write differential signal pairs induce crosstalk on the read signal pair. This added noise limits the frequency at which the heads can be sensed and controlled. It also limits the reliability of the disk drive as a whole, reducing its life expectancy. This reduction in life expectancy is a cumulative effect of this noise, heating while the disk drive is operating and cooling when the disk drive is turned off.

SUMMARY OF THE INVENTION

The invention includes head arms providing head slider electrical interconnection as two or more essentially coplanar, parallel trace pairs near a ground plane to a disk drive read and write interface. These parallel traces use the metallic body of the head arm as a ground plane, insuring that the neighboring pairs of parallel traces used for differential read and write interconnection have essentially matched impedance. This is done through the uniform distance between traces and the uniform height of the traces from the ground plane of the head arm, creating matched impedance line pairs and significantly reducing crosstalk.

The invention includes voice coil actuator arms comprised of at least one of such head arms providing electrical interconnection.

The voice coil actuator arms may further comprise a top head arm using a bottom face for interconnection, at least one interior head arm using both top and bottom face for interconnection and a bottom head arm using the top face for interconnection.

The method of manufacturing a voice coil actuator arm using a head arm containing parallel traces near a ground plane made from the metallic infrastructure of the head arm produces voice coil actuators with superior reliability, due to the matched impedance lines providing read/write head interconnection.

Such interconnection schemes are cost efficient to manufacture, providing matched impedance line pairs for each of the several read/write heads supported by the actuator arm assembly.

The manufacturing method further includes making these interconnections by at least one of the following: Bridge Flexible Cable (BFC), Flex On Suspension (FOS) and Trace Suspension Assembly (TSA).

The invention includes the disk drives made using these voice coil actuator arms. Providing matched impedance lines to read/write heads, reduces noise and improves disk drive reliability. Improved reliability supports increased disk drive life span. Reduced noise improves track density.

These and other advantages of the present invention will become apparent upon reading the following detailed descriptions and studying the various figures of the drawings.

BRIEF DESCRIPTION OF THE DRAWINGS

FIG. 2A illustrates a top view of a prior art actuator arm 30 showing head arm 50, actuator axis 40, and head slider 60 of FIG. 1 with detail region 70 illustrated in FIG. 2B;

FIG. 2B illustrates a top view of detail region 70 of FIG. 2A;

FIG. 2C illustrates a side view of part of detail region 70 of FIG. 2B indicating the interconnections 74–80 to various head sliders as found in the prior art, interconnections 74 and 76 may provide the differential read signals, interconnections 78 and 80 would then provide the differential write signals;

FIG. 2D illustrates a different perspective on FIG. 2C, illustrating that these signal interconnections 74 to 80 may be provided as strips for use in an automated reflow solder system;

FIG. 2E illustrates an alternative prior art electrical interconnection scheme for 74–80 essentially parallel to head arm 50;

FIG. 2F illustrates a typical signal strength situation between a write differential signal pair and a read differential signal pair;

FIG. 4A illustrates disk drive 10 including voice coil actuator 30 comprising a head arm 150 of FIG. 3B; and FIG. 4B illustrates disk drive 10 including voice coil actuator 30 comprising head arms 150, 152, and 154 of FIG. 3B.

DETAILED DESCRIPTION OF THE INVENTION

Figure 1A:
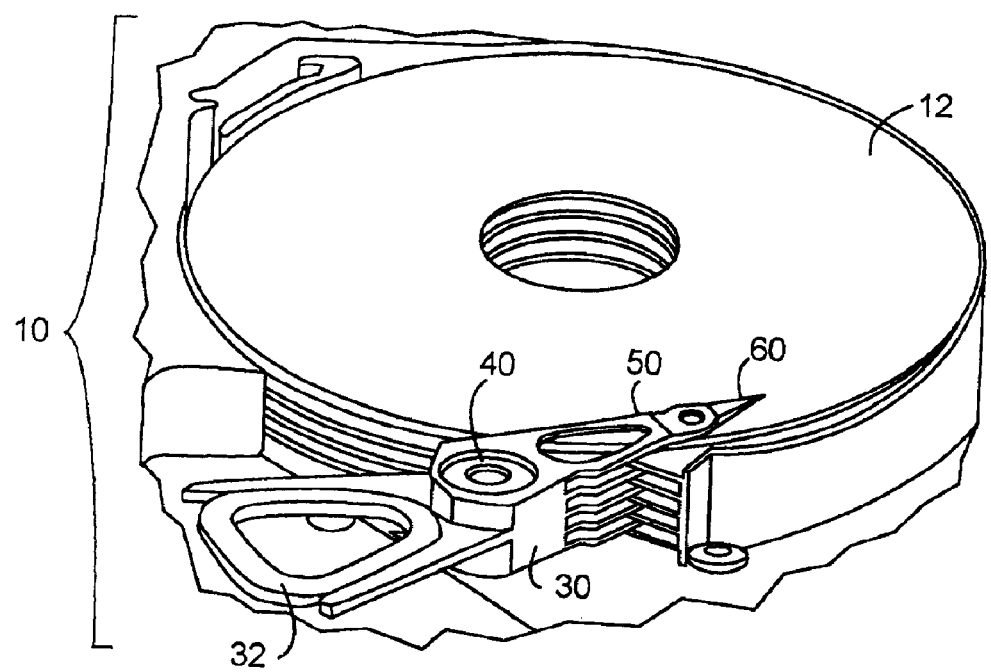
FIG. 1A illustrates a typical high prior art capacity disk drive 10 including actuator arm 30 with voice coil 32, actuator axis 40, suspension or head arms 50–58 with slider/head unit 60 placed among the disks.
Figure 1B:
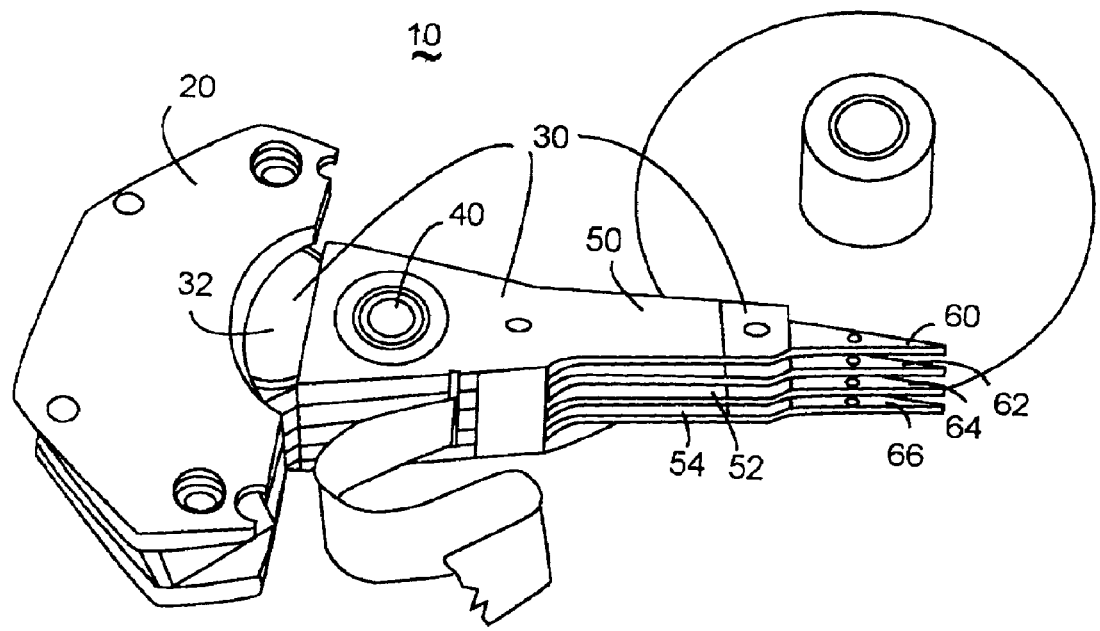
FIG. 1B illustrates a typical prior art high capacity disk drive 10 with actuator 20 including actuator arm 30 with voice coil 32, actuator axis 40, head arms 50–56 and slider/head units 60–66 with the disks removed.
Figure 3A:
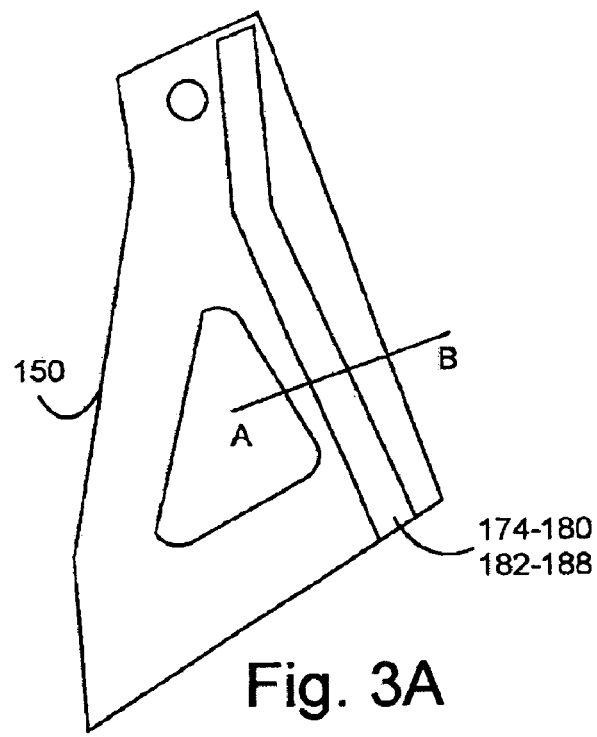
FIG. 3A illustrates a voice coil actuator containing a head arm 150 in accordance with the invention.

FIG. 3A illustrates a voice coil actuator containing a head arm 150 in accordance with the invention.

In FIG. 3A, the head arm 150 includes at least one ground plane formed in the head arm, using the metallic body of the head arm. The head arm includes a first and a second pair of coplanor, parallel transmission paths 174–150 essentially parallel to the ground plane. The head arm 150 may further include a third and a fourth pair of coplanor, parallel transmission paths 182–188 essentially parallel to the ground plane.

Figure 3C:
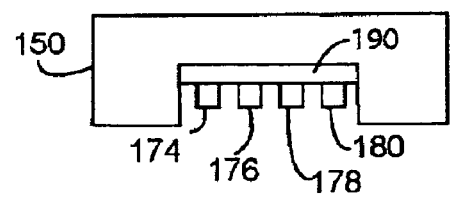
FIG. 3C provides a detail of head arm 150 showing a dielectric layer 190 separating traces 174–180 from the ground plane of head arm 150.
Figure 3B:
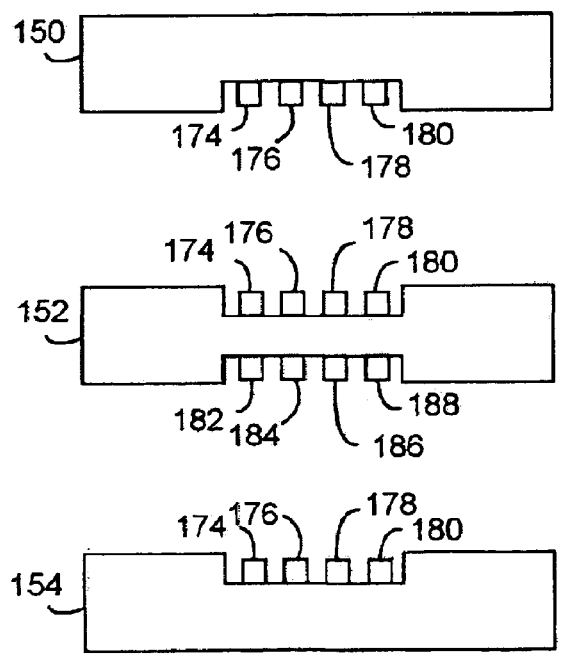
FIG. 3B illustrates a cross sectional view of three head arms 150, 152 and 154 through line A–B of FIG. 3A.

FIG. 3B illustrates a cross sectional view of three head arms 150, 152 and 154 through line A–B of FIG. 3A. Each head arm contains at least two differential signal pairs through traces 174, 176, 178 and 180, which are coplanar, parallel and close to ground planes provided by the metallic infrastructure of each head arm. Note that head arm 152 also includes third and fourth differential signal pairs through traces 182–188, again essentially coplanar, parallel and close to the ground plane of head arm 152.

The head arms 150–154 provide head slider electrical interconnection as two or more essentially coplanar, parallel trace pairs 174, 176, 178 and 180 near a ground plane to a disk drive read and write interface. By using the metallic body of the head arm as a ground plane, these parallel trace pairs 174, 176, 178 and 180 insure that parallel trace pairs used for differential read and write interconnection have essentially matched impedance. This is done through the uniform distance between traces and the uniform height of the traces from the ground plane of the head arm, creating matched impedance line pairs and significantly reducing crosstalk.

Note that the invention includes voice coil actuators including at least one of such head arms 150, 152, and/or 154 providing electrical interconnection.

As used herein, the first head arm refers to the head arm 152. The head arm 150 refers to a second head arm. The head arm 154 refers to a third head arm. The head arm collection includes the first, second, and third bead arms.

The voice coil actuators 30 may further comprise a top head arm 150 using a bottom face for interconnection, at least one interior head arm 152 using both top and bottom face for interconnection and a bottom head arm 154 using the top face for interconnection.

FIG. 3C provides a detail of head arm 150 showing a dielectric layer 190 separating traces 174–180 from the ground plane of head arm 150. As one of skill in the art will recognize, there are a wide variety of material choices for the infrastructure of head arm 150, dielectric layer 190 and traces 174–180.

Note that the use of a predominantly copper alloy for at least the traces 174–180 may be preferred in certain applications. Use of a predominantly aluminum alloy infrastructure may be preferred for head arm 150. Dielectric 190 may preferably be a polyimide material, often used in Flex on Suspension printed circuit production.

Note that an additional parallel, coplanar trace tied to ground may be placed between trace pairs to further minimize crosstalk.

The method of manufacturing includes making a voice coil actuator arm 30 using a head arm 150–154 containing parallel traces near a ground plane made from the metallic infrastructure of the head arm. This method produces voice coil actuator arms 30 with superior reliability, due to the matched impedance lines providing read/write head interconnection.

The method of manufacture includes, but is not limited to, the signal traces being part of a flex circuit manufacturing method. The manufacturing method further includes making these interconnections by at least one of the following: Bridge Flexible Cable (BFC), Flex On Suspension (FOS) and Trace Suspension Assembly (TSA).

Such interconnection schemes are cost efficient to manufacture, providing matched impedance line pairs for each of the several read/write heads supported by the actuator arm assembly.

The invention includes the disk drives 10 made using these voice coil actuator arms 30. Providing matched impedance lines to read/write heads, reduces noise and improves disk drive reliability. Improved reliability supports increased disk drive life span. Reduced noise improves track density.

FIG. 4A illustrates disk drive 10 including a voice coil actuator arm 30 comprising a head arm 150 of FIG. 3B.

FIG. 4B illustrates disk drive 10 including the voice coil actuator arm 30 comprising head arms 150,152, and 154 of FIG. 3B.

In FIGS. 4A and 4B, each of the head arms 150, 152, and 154 provides at least one ground plane formed in said head arm by its metallic body. Each of the head arms 150, 152, and 154 includes a first pair of coplanar, parallel transmission paths 174 and 176 as well as, a second pair of coplanor, parallel transmission paths 178 and 180 essentially parallel to said ground plane.

In FIGS. 4A and 4B, each of the head arms 150, 152, and 154 provides at least one ground plane formed in said head arm by its metallic body. Each of the head arms 150, 152, and 154 includes a first pair of coplanar, parallel transmission paths 174 and 176 as well as, a second pair of coplanar, parallel transmission paths 178 and 180 essentially parallel to said ground plane.

In FIGS. 4A and 4B, the head arm 150 interconnects the first pair of coplanar, parallel transmission paths 174 and 176 by a read differential wire pair 300 and 302 to a head slider 60, and to a disk drive read interface 200. The head arm 150 interconnects the second pair of coplanar, parallel transmission paths 178 and 180 by a write differential wire pair 350 and 352 to a head slider 60 and to a disk drive write interface 250.

In FIG. 4B, the second head arm 152 interconnects the first pair of coplanar, parallel transmission paths 174 and 176 by a read differential wire pair to a head slider 62, and to a disk drive read interface 202. The head arm 152 interconnects the second pair of coplanar, parallel transmission paths 178 and 180 by a write differential wire pair to a head slider 60 and to a disk drive write interface 252.

In FIG. 4B, the first head arm 152 also includes a third coplanar, parallel transmission paths 182 and 184 as well as, a fourth pair of coplanar, parallel transmission paths 186 and 188. Both third and fourth pairs of coplanar parallel transmission paths are essentially parallel to the ground plane. The third coplanar, parallel transmission paths 182 and 184 interconnecting both a second read differential wire pair to a second head slider 64, and to a second disk drive read interface 204. The fourth pair of coplanar parallel transmission paths 186 and 188 interconnect a second write differential wire pair to a second head slider 64, and to a second disk drive read interface 254.

In FIG. 4B, the third head arm 154 interconnects the first pair of coplanar parallel transmission paths 174 and 176 by a read differential wire pair to a head slider 66, and to a disk drive read interface 206. The head arm 150 interconnects the second pair of coplanar, parallel transmission paths by a write differential wire pair to a head slider 66 and to a disk drive write interface 256.

The preceding embodiments have been provided by way of example and are not meant to constrain the scope of the following claims.

What is claimed is:

1. A voice coil actuator arm comprising:
   a head arm collection including a first head arm, a second head arm and a third head arm;
   wherein each head arm of said head arm collection is comprised of:
   at least one ground plane formed in said head arm; and
   a first and a second pair of coplanar, parallel transmission paths essentially parallel to said ground plane interconnecting both a read differential wire pair and a write differential wire pair to a head slider, respectively;
   said first parallel transmission path pair interconnects to a disk drive read interface; and
   said second parallel transmission path pair interconnects to a disk drive write interface.

2. The apparatus of claim 1,
   wherein said first head arm is further comprised of:
   a third and a fourth pair of coplanar, parallel transmission paths essentially parallel to said ground plane interconnecting both a second read differential wire pair and a second write differential wire pair to a second head slider, respectively;
   said third parallel transmission path pair interconnects to a second disk drive read interface; and
   said fourth parallel transmission path pair interconnects to a second disk drive write interface.

3. The apparatus of claim 1, further comprising:
   an analog interface interconnecting said first parallel transmission path and said disk read interface, for at least one of said head arms; and
   said analog interface interconnecting said second parallel transmission path and said disk write interface, for at least one of said head arms.

4. The apparatus of claim 1, further comprising:
   an analog interface interconnecting said first parallel transmission path and said disk read interface, for each of said head arms; and
   said analog interface interconnecting said second parallel transmission path and said disk write interface, for each of said head arms.

5. A disk drive comprising said voice coil actuator arm of claim 1.

6. A method for a head arm providing electrical interconnection of a read differential wire pair and a write differential wire pair between a head slider and a disk drive read interface and a disk drive write interface, respectively, comprising the steps of:
   creating a ground plane in said head arm;
   providing at least two differential signal paths as essentially parallel, coplanar traces on said head arm traversing an essentially fixed distance parallel to said ground plane as a first differential trace pair and a second differential trace pair;
   providing connectivity to said head slider for said read differential wire pair and for said write differential wire pair via said first and said second differential trace pair, respectively;
   providing connection to said disk drive read interface via said first differential trace pair; and
   providing connection to said disk drive write interface via said second differential trace pair.

7. The method of claim 6 providing electrical interconnection by a voice coil actuator arm through at least one head arm between at least one head slider coupled to said head arm and a disk drive read interface and a disk drive write interface, for said head slider, further comprising the step of:

said head arm providing electrical interconnection between said head slider and said disk drive read interface and said disk drive write interface.

8. The method of claim 7, further comprising the step of:

said head arm providing electrical interconnection between a second head slider and said disk drive read interface and said disk drive write interface, further comprising the steps of:

providing a third differential signal path and a fourth differential signal path as essentially parallel, coplanar traces on said head arm traversing essentially parallel to said ground plane as a third differential trace pair and a fourth differential trace pair;

providing connectivity to said second head slider for a second read differential wire pair and for a second write differential wire pair via said third differential trace pair and said fourth differential trace pair, respectively;

providing connection to a second disk drive read interface via said third differential trace pair; and providing connection to a second disk drive write interface via said fourth differential trace pair.

9. The method of claim 8, wherein said voice coil actuator arm is further comprised of a second head arm; and said method further comprising the step of:

said second head arm providing electrical interconnection between a third head slider and a third disk drive read interface and a third disk drive write interface, further comprising the steps of:

creating a ground plane in said second head arm;

providing at least two differential signal oaths as essentially parallel, coplanar traces on said second head arm traversing an essentially fixed distance parallel to said ground plane as a first differential trace pair and a second differential trace pair;

providing connectivity to said third head slider for said read differential wire pair and for said write differential wire pair via said first and said second differential trace pair, respectively;

providing connection to said disk drive read interface via said first differential trace pair; and providing connection to said disk drive write interface via said second differential trace pair.

10. The method of claim 9, wherein said voice coil actuator arm is further comprised of a third head arm; and said method further comprising the step of:

said third head arm providing electrical interconnection between a fourth head slider and a fourth disk drive read interface and a fourth disk drive write interface, further comprising the steps of:

creating a ground plane in said third head arm;

providing at least two differential signal oaths as essentially parallel, coplanar traces on said third head slider traversing an essentially fixed distance parallel to said around plane as a first differential trace pair and a second differential trace pair;

providing connectivity to said fourth head slider for said read differential wire pair and for said write differential wire pair via said first and said second differential trace pair, respectively;

providing connection to said disk drive read interface via said first differential trace pair; and providing connection to said disk drive write interface via said second differential trace pair.

11. The method of claim 7, wherein the step providing connection to said disk drive read interface via said first differential trace pair is further comprised of the steps of:

providing a first read analog interface connection to said first differential trace pair; and providing a first disk read analog interface connection to said disk drive read interface; and wherein the step providing connection to said disk drive write interface via said second differential trace pair is further comprised of the steps of:

providing a first write analog interface connection to said second differential trace pair; and providing a first disk write analog interface connection to said disk drive write interface.

12. The method of claim 6, further comprising the steps of:

providing a third differential signal path and a fourth differential signal path as essentially parallel, coplanar traces on said head arm traversing an essentially fixed distance parallel to said ground plane as a third differential trace pair and a fourth differential trace pair;

providing connectivity to a second head slider for a second read differential wire pair and for a second write differential wire pair via said third and said fourth differential trace pair, respectively;

providing connection to a second disk drive read interface via said third differential trace pair; and providing connection to a second disk drive write interface via said fourth differential trace pair.

13. A head arm comprising:

at least one ground plane formed in said head arm; and a first and a second pair of coplanar, parallel transmission paths essentially parallel to said ground plane interconnecting both a read differential wire pair and a write differential wire pair to a head slider;

said first parallel transmission path pair interconnects to a disk drive read interface; and said second parallel transmission path pair interconnects to a disk drive write interface.

14. A voice coil actuator arm comprising at least one head arm as in claim 13.

15. The voice coil actuator arm of claim 14, wherein said head arm is further comprised of:

a third and a fourth pair of coplanar, parallel transmission paths essentially parallel to said ground plane interconnecting both a second read differential wire pair and a second write differential wire pair to a second head slider;

said third parallel transmission path pair interconnects to a second disk drive read interface; and said fourth parallel transmission path pair interconnects to a second disk drive write interface.

16. The voice coil actuator arm of claim 15, further comprising:

a second head arm interconnecting a third head slider, a third disk read interface and a third disk write interface.

17. The voice coil actuator arm of claim 16, further comprising:

a third head arm interconnecting a fourth head slider, a fourth disk read interface and a fourth disk write interface.

18. The voice coil actuator arm of claim 14, further comprising:

an analog interface interconnecting said first parallel transmission path and said disk read interface; and said analog interface interconnecting said second parallel transmission path and said disk write interface.

19. A disk drive comprising said voice coil actuator arm of claim 14.

20. The head arm of claim 13, further comprising:

a third and a fourth pair of coplanar, parallel transmission paths essentially parallel to said ground plane interconnecting both a second read differential wire pair and a second write differential wire pair to a second head slider;

said third parallel transmission path pair interconnects to a second disk drive read interface; and said fourth parallel transmission path pair interconnects to a second disk drive write interface.

* * * * *